United States Patent [19]
Roland

[11] Patent Number: 5,146,689
[45] Date of Patent: Sep. 15, 1992

[54] KEY READING METHOD AND APPARATUS
[75] Inventor: Max G. Roland, San Clemente, Calif.
[73] Assignee: Maromatic Company, Inc., Mountain View, Calif.
[21] Appl. No.: 827,766
[22] Filed: Jan. 29, 1992
[51] Int. Cl.[5] .................... G01B 11/24; G01D 5/32
[52] U.S. Cl. ........................................... 33/539
[58] Field of Search ................... 33/539; 70/460, 394
[56] References Cited

U.S. PATENT DOCUMENTS

| | | |
|---|---|---|
| 3,264,742 | 8/1966 | Roland . |
| 3,496,636 | 2/1970 | Lieptz . |
| 3,735,496 | 5/1973 | Lee . |
| 3,831,282 | 8/1974 | Falk . |
| 3,919,920 | 11/1975 | Schlage . |
| 4,012,991 | 3/1977 | Uyeda . |
| 4,090,303 | 5/1978 | Uyeda . |
| 4,433,487 | 2/1984 | Roland . |
| 4,516,327 | 5/1985 | Kanda et al. . |
| 4,526,498 | 7/1985 | Fieldhouse . |

Primary Examiner—Harry N. Haroian
Attorney, Agent, or Firm—Larson and Taylor

[57] ABSTRACT

A method and apparatus for reading a key to determine the depth of its notches. A frame is moveable towards and away from the key, this frame having a reading pin and a plurality of contact pins thereon, all of those pins being spring biased towards the key and moveable against the spring, away from the key. A reader body is fixed on the reading pin and has a plurality of recesses, one recess associated with each contact pin, each recess being of a different depth. Once the reading pin engages a key notch, the contact pins continue to move a certain distance. The depth of the notch is dependent on the number of contact pins which have engaged the bottoms of their respective recesses on the reader body. Each such contact closes an electrical connection so that the depth of the notch is dependent on the number of contact pins which have contacted the bottoms of their respective recesses.

19 Claims, 4 Drawing Sheets

KEY READING METHOD AND APPARATUS

FIELD OF THE INVENTION

This invention relates to the manufacture of keys and locks, and it relates in particular to a method and apparatus for reading notches formed in a key.

BACKGROUND OF THE INVENTION

In the key and lock art, the usual practice is to first manufacture the keys, after which the code of each key, for example the notches formed along the edge of the key, are read, the results of that reading then being used to manufacture the corresponding lock cylinder, or specifically, to determine the characteristics of the tumbler pins thereof so that the lock cylinder mates with its respective key.

One known key reading technique is shown in my prior U.S. Pat. No. 3,264,742. In the device shown therein, a separate contact pin associated with each key notch position mechanically operates a resistor arm to create an electric signal dependent upon the depth of that particular notch. However, while this prior device is operable for its intended purpose, it is relatively slow and therefore not acceptable for use with more modern high speed key and lock manufacturing techniques.

Thus, a need exists for a new and improved method and apparatus for reading the code of a key, for example the notches in the edge of a key, especially in connection with the manufacture of a corresponding, mating lock cylinder.

SUMMARY OF THE INVENTION

It is a purpose of the present invention to provide a new and improved key reading method and apparatus which overcomes the disadvantages of the prior art and provides an enhanced, more rapid, efficient and reliable key reading.

In accordance with the present invention, this purpose is achieved by providing a new key reading method and apparatus wherein a key is positioned to be read by a single reading pin which cooperates with a plurality of contact pins, moveable relative to the reading pin. Each contact pin represents one of the depths capable of being sensed by the reading pin. The nature of movement of all of the reading pins then determines the depth of the subject notch.

In accordance with a preferred apparatus, a frame mounting the reading pin and contact pins is moveable a certain distance towards a key until a reference position is reached relative to a notch in the key. At this reference position of the frame, the position of the reading pin will vary, depending on the depth of the notch. Thereafter, the frame moves a certain fixed distance toward the key, at first carrying all contact pins therewith. During this subsequent frame movement, the reading pin remains stationary, compressing a spring as the frame continues to move. A reader body fixed to the reading pin and movable therewith senses this relative movement of the individual contact pins. The reader body has a plurality of recesses, one for each contact pin, the recesses each being of a different depth. As the frame continues this movement toward the key, some contact pins engage the bottoms of their respective recesses, closing an electrical circuit to transmit an electrical signal. At the shallowest notch, all contact pins will engage the bottoms of their respective recesses, creating an electrical current through al contact pins. However, when reading the deepest notch, only one contact pin will engage the bottom of its respective recess, creating an electrical current only through that one contact pin. Thus, by sensing the number of contact pins which contact the bottoms of their respective cylinders during this subsequent movement of the frame relative to the reading pin, it is possible to determine the depth of the notch. The contact pins may thus move different distances from each other, dependent upon the location of their respective recessed bottoms, while the frame continues to move for the full predetermined distance This variation in movement of the contact pins is accomplished by mounting each contact pin resiliently on the frame so that when it engages the bottom of its respective recess, prior to complete movement of the frame, that contact pin will compress its spring so as to remain stationary upon continued movement of the frame.

In a preferred method in accordance with the present invention, after positioning a key to be read, a reading pin is moved into the subject notch after which a plurality of contact pins move parallel to the reading pin, after the latter has reached the notch, there being a separate contact pin for each different depth which is capable of being sensed at that notch. The depth of that notch is determined by sensing movement of the respective contact pins and generating an electric signal representing the depth of that notch as a function of movement of the contact pins.

In accordance with the preferred method and apparatus of the present invention, the signal generated and representing the depth of the notch being read is then utilized to determine the construction of a lock cylinder useable with that key, and specifically, to determine the characteristics of the tumblers of that lock cylinder so that it will be operated by that key.

It is to be understood, however, that the results obtained by the key reading in accordance with the present method and apparatus can have any number of other uses, for example making a duplicate key or unlocking a lock which is responsive to electrical signals dependent on the depth of the key notches, as contrasted, for example, to the simple mechanical opening of a lock.

In accordance with the method and apparatus of the present invention, the key is preferably fixed at a given position after which the frame, reading pin and contact pins move perpendicular to the axis of the key, into an edge notch. Each notch is read in a fraction of a second. After reading the first notch, the frame with the reader and contact pins is retracted, the key is indexed to the next notch position and then the reading procedure is repeated, and so on until all notch positions have had their respective depths read. A single notch can be read in a fraction of a second, so that reading up to ten notch positions on a given key will take no more than two seconds.

In the preferred specific embodiment of the present invention, the frame mounts a plurality of contact pins, one for each depth. Generally, depending on the type of key, there will be between three to ten contact pins representing three to ten different depths. These contact pins are preferably circumferentially spaced about the reading pin. In a preferred embodiment, the various recesses would differ from each other in depth approximately 0.015 inches. The key reader has a tolerance of plus or minus 0.002 inches, meaning that the reader can correctly measure keys which are cut to within plus or minus 0.002 inches.

At their upper ends, the contact pins would have wires leading to a control and/or other electronic equipment. The contact and reading pins would be made of an electrically conductive material, preferably steel and their lower ends would be connected to ground, when contact is made, through a conductive, preferably a brass reader body, a steel reading pin and a conductive key and through the apparatus mounting the key. The frame itself would be made of an electrically insulating material.

Thus, it is a purpose of the present invention to provide a new and improved key reading method and apparatus It is another object of the present invention to provide a new and improved apparatus for reading the notches in a key and utilizing that information to manufacture a lock cylinder mated to that key.

It is still another object of the present invention to provide a new and improved key reading apparatus having a reading pin which engages a key and has a reader body thereon together with a plurality of contact pins mounted for initial movement with the reading pin and then subsequently relative thereto, coupled with means for sensing the subsequent relative movement of the contact pins to determine the depth of the notch being read.

It is still another object of the present invention to provide a new and improved method for reading a key notch comprising the steps of moving a reading pin into the notch and then moving contact pins parallel to and relative to the reading pin and sensing movement of the contact pins to determine the depth of the notch.

These and other objects of the present invention will be apparent from the detailed description to follow.

BRIEF DESCRIPTION OF THE DRAWINGS

There follows a detailed description of preferred embodiments of the present invention, to be read together with the accompanying drawings wherein.

DETAILED DESCRIPTION OF THE PREFERRED EMBODIMENTS

Figure 1:
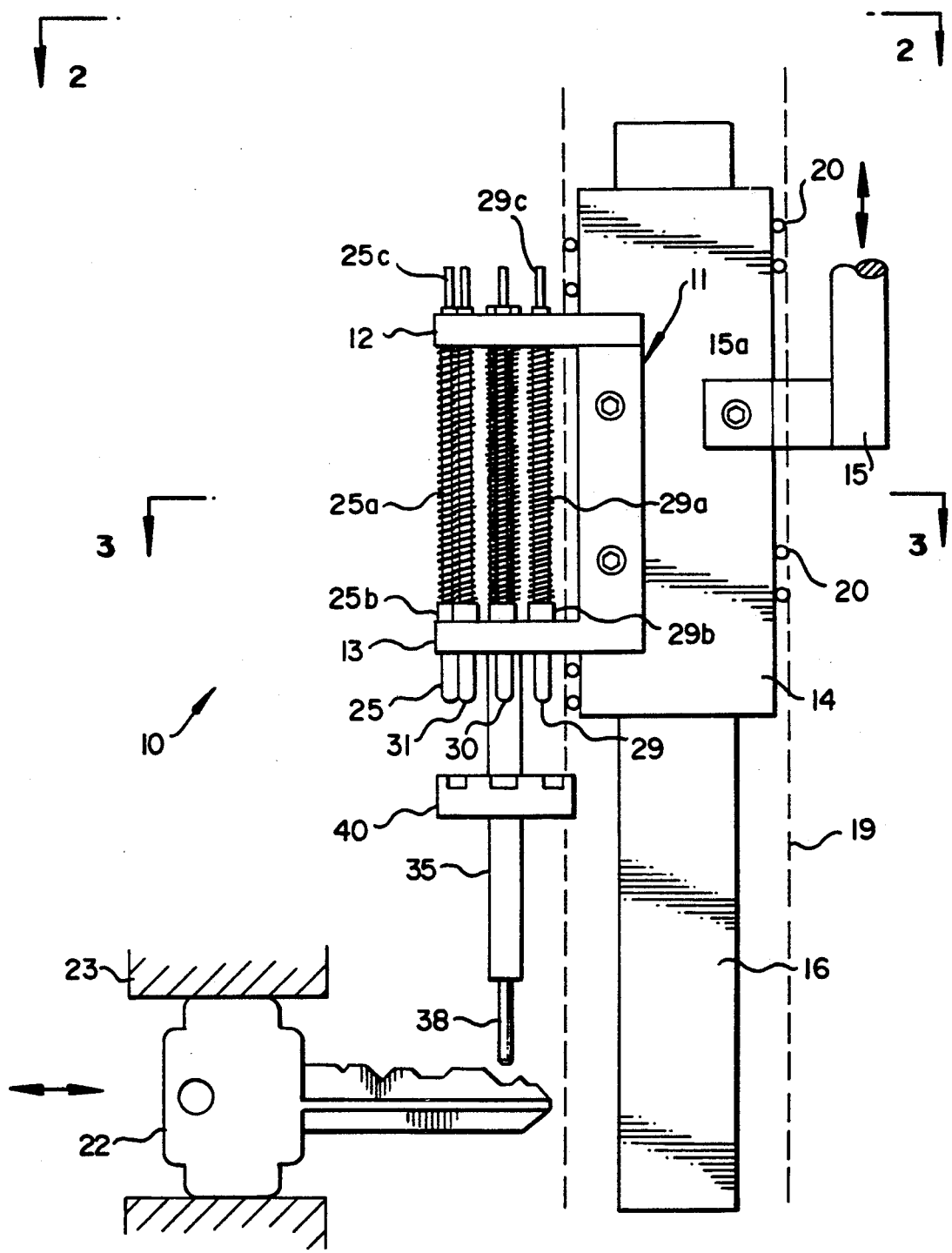
FIG. 1 is a schematic, side elevational view of a key reading apparatus in accordance with the present invention.
Figure 2:
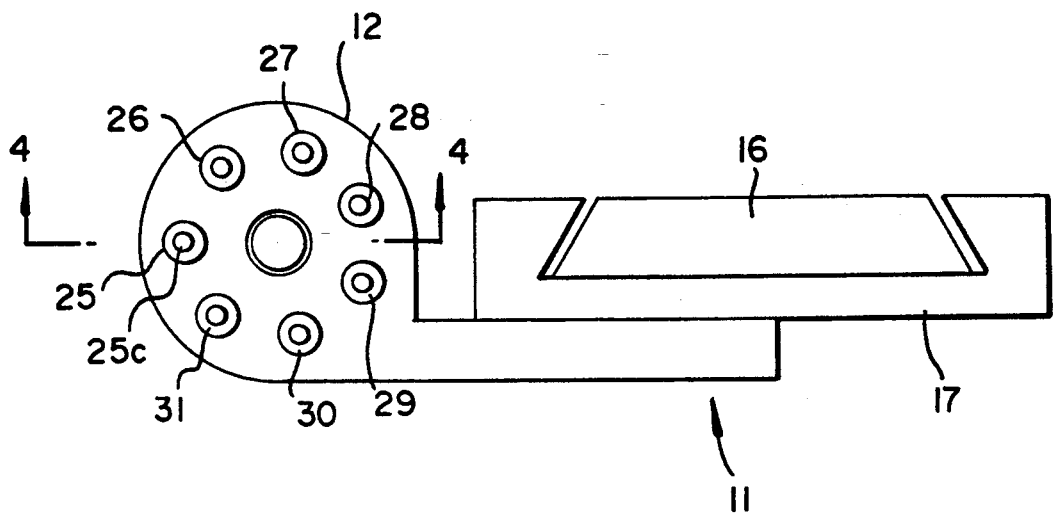
FIG. 2 is a top plan view, taken along line 2—2 of FIG. 1.
Figure 3:
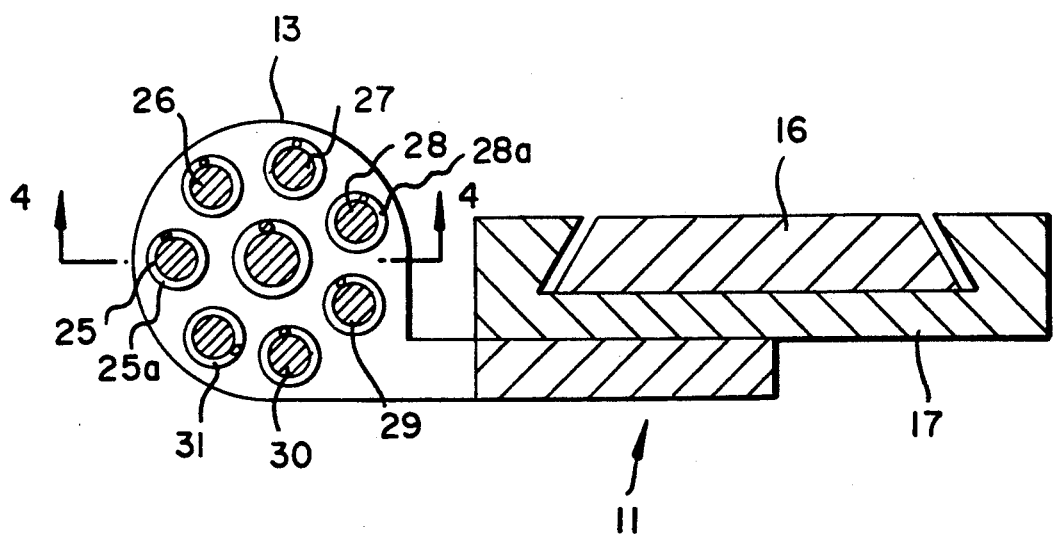
FIG. 3 is a horizontal cross-sectional view taken along line 3—3 of FIG. 1.

Referring now to the drawings, like elements are represented by like numerals throughout the several views.

FIG. 1 illustrates in schematic side view a key reading apparatus 10. A support frame 11 has an upper arm 12 and a lower arm 13. This arm 11 is fixed by bolts to a slide member 14 which is slidable towards and away from the key (vertically as oriented in the figures) along a fixed part of 16 of the slide. Vertical movement of slide member 14 along member 16 is accomplished by an air cylinder, the piston rod 15 of which is shown in FIG. 1 fixed to the slide member 14 by a bracket 15a.

The moveable slide member 14 is positioned within a slide housing indicated diagrammatically at dotted lines 19, with movement therein being positioned and facilitated by rollers 20 positioned between the slide member 14 and the sides of slide housing 19.

Figure 4:
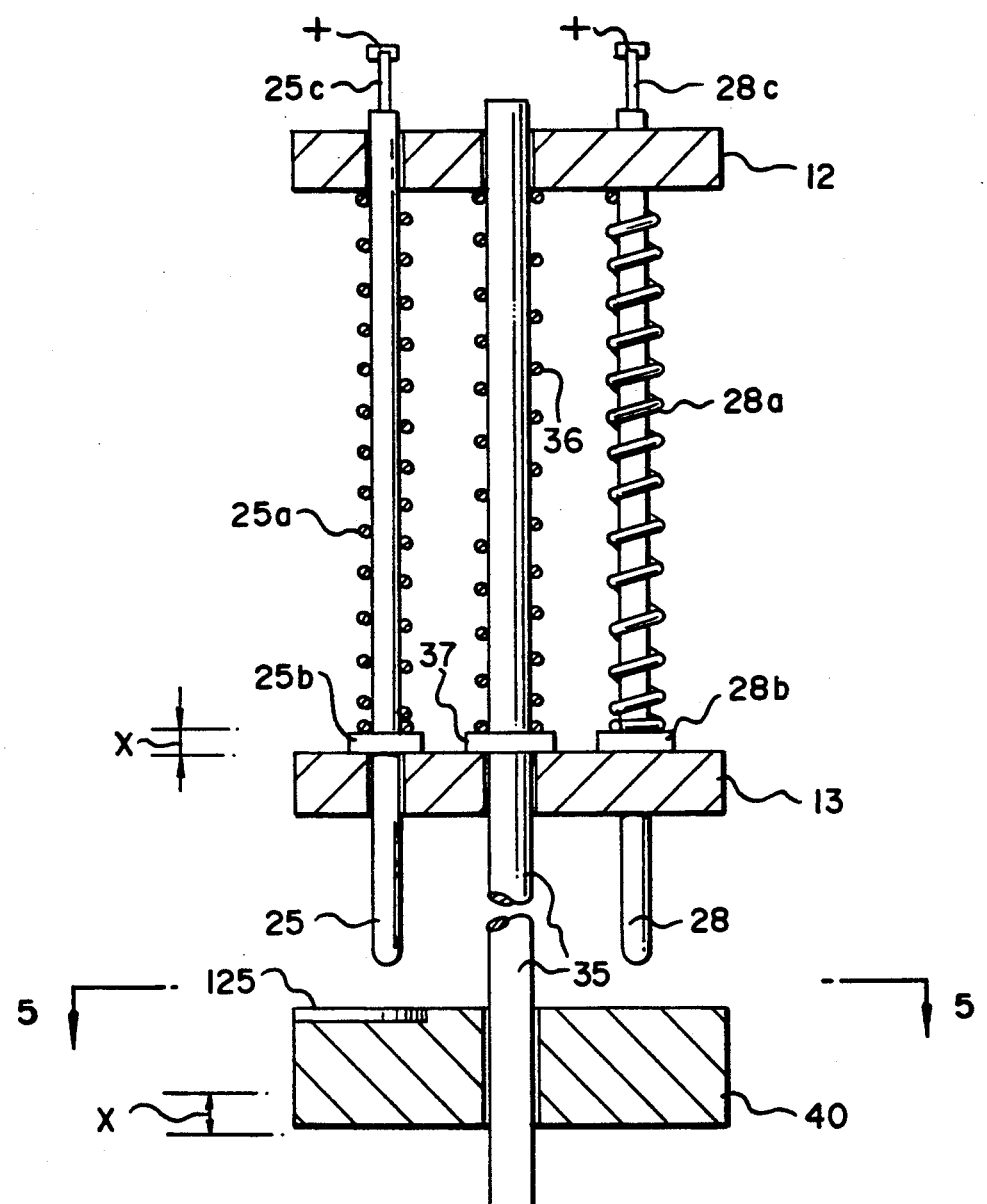
FIG. 4 is an enlarged cross-sectional view of a portion of the apparatus, taken along line 4—4 of FIGS. 2 and 3.

As shown schematically at the lower left of FIGS. 1 and 4, a key 22 is mounted in a frame 23 which fixes the key in position vertically while permitting horizontal indexing movement, as indicated by the double arrow in these figures Referring now to FIGS. 1 through 4, a plurality of contact pins 25 through 31 are mounted in the frame 11, supported by the upper and lower arms thereof, 12 and 13. For each contact pin, the same numeral is used with the subscript "a" to represent its spring, the subscript "b" to represent its spring stop shoulder and subscript "c" to represent the electrical connection at its upper end.

Referring now especially to FIG. 4, the contact pins are identical to each other so that only one contact pin need be described in detail. As shown in the figures, pin 25 is mounted in openings formed in the upper and lower frame arms 12 and 13. Just above the frame arm 13, the contact pin has fixed thereon a spring stop shoulder 25b against which a spring 25a is urged to resiliently force the contact pin 25 downwardly. At its upper end, contact 25c connects this contact pin to suitable electrical equipment, to be described below.

As will be apparent from the following discussion, each contact pin represents a different depth which is capable of being read at a given notch position. In the illustrated embodiment, seven contact pins are illustrated, meaning that this apparatus can sense seven different depth levels in each notch. It will be understood, however, that the number of contact pins can be varied and will depend on the type of key and lock being manufactured.

The apparatus includes a reading pin 35, preferably with the contact pins spaced circumferentially thereabout. The reading pin 35 is also mounted in suitable openings in the frame arms 12 and 13 and it includes a spring 36 which acts against spring stop 37 to urge the reading pin 35 downwardly. The lower end of reading pin 35 includes the key engaging lower tip 38.

Figure 5:
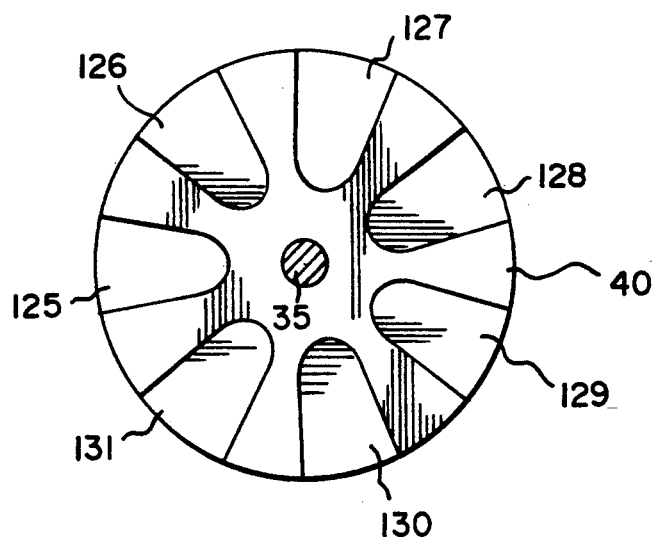
FIG. 5 is a horizontal cross-sectional view taken along line 5—5 of FIG. 4.

Fixed to the reading pin 35 is a reader body 40. Referring to FIG. 5, this reader body includes a separate recess for each contact pin, in this case the recesses being numbered 125 through 131 to correspond to contact pins 25 through 31, respectively. The recesses 125 through 131 are of varying depths, which depths increase uniformly from the shallowest recess to the deepest recess.

For example, in the illustrated embodiment, the shallowest recess would be 125 which cooperates with reading pin 25. Each recess would be deeper than the depth of recess 125 by 0.015 inches. Thus, recess 126 would be 0.015 inches deeper than recess 125, recess 127 would be 0.030 inches deeper than recess 125, and so on, until recess 131 would be 0.090 inches deeper than recess 125. The key reader has a tolerance of plus or minus 0.002 inches, meaning that the reader can correctly measure keys which are cut to within plus or minus 0.002 inches.

An electrically conductive path must exist from the uppermost part of each contact pin, i.e., 25c through 31c, to the reader body 40 for those contact pins which in fact engage the reader body, and then through the lower part of the reading pin 35, the lower end 38 thereof and into the key to reach the machine ground in the framework holding the key. Preferably, the reading and contact pins would be made of steel, the reader body of brass and the frame 11, including arms 12 and 13 thereof, of an insulating material. With the recesses varying in depth by 0.015 inches, this provides an ample ability to assure that each contact pin will reliably close the electrical circuit when it reaches the bottom of its respective recess.

Although the method of operation of the present invention will be apparent from the preceding discussion, for purposes of clarity and convenience, it will be summarized below.

Referring to FIG. 4, at the bottom thereof, the difference in height as between the deepest notch and the shallowest notch (or actually, the absence of a notch) is represented by the arrow "X". Initially, the air cylinder 20 is operated to move its rod 15 downwardly, thus moving the slide member 14 and the frame 11 and all of its elements downwardly. This continues until reaching a reference position, as shown in FIG. 4. At this reference height, if the reading pin is lined up with the deepest possible notch, the lower tip 38 will just engage that notch and the elements 40 and 37 will also be as shown. However, at this reference position if the notch has the shallowest depth, then the reading pin lower tip 38 as well as the reader body 40 and of course the spring stop 37 and for that matter the entire reading pin 35 will be raised by the full distance X, against the resilient force of spring 36. Of course for any notch depth in between, these elements will be raised by an appropriate amount more than zero but less than X.

It will thus be seen that when the frame has moved downwardly to this certain reference height, the vertical position of the reading pin 35 and all elements connected thereto will vary, relative to the frame, by an amount between zero and X.

Having reached this reference height, the frame continues to move downwardly. Reading pin 35 and all elements connected thereto are restrained against further downward movement and hence compress the spring 36, allowing downward movement of the frame arms 12 and 13 relative thereto. The frame will always move downwardly from the above described reference height by a fixed distance H which would cause the contact pins, if unrestrained, to move to line Y—Y. (See FIG. 6.)

Starting with the elements as shown in FIG. 4, i.e., with the frame at the reference height, and with the lower tip 38 at the deepest notch depth, upon subsequent movement of the frame through the predetermined distance H, all contact pins will move to line Y—Y, wherein only the pin 25 will engage the bottom of its respective recess 125. The remaining pins 26 through 31 will not have reached the bottoms of their respective recesses 126 through 131. This situation is represented by the lower reader body 40 of FIG. 6.

Figure 6:
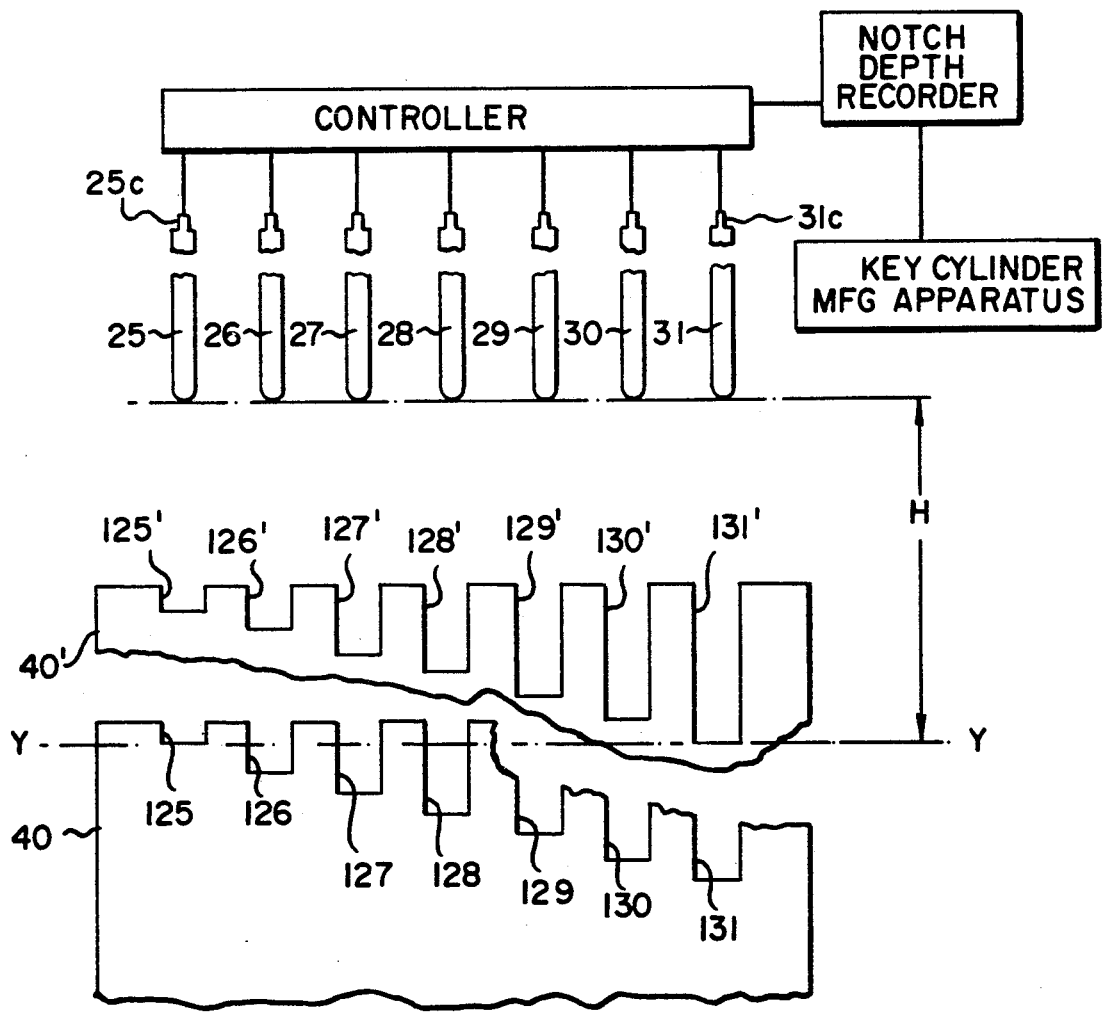
FIG. 6 is a diagrammatic view, with parts shown in development, to illustrate the operation of the present invention.

At the other extreme, if at the above described reference height, the lower tip 38 had moved down only to the top of distance X, i.e., resting on what is essentially a no-notch position of the key, then the reader body 40 will be raised, corresponding to the position 40' in FIG. 6. As the frame moves through the distance H, contact pin 31 will move all the way to and engage the bottom of its recess 131'. Naturally all of the other contact pins 25 through 30, which could move to line Y—Y if restrained, will in fact reach and engage the bottoms of their respective recesses. To the extent that contact pins 25 through 30 move a distance less than the frame and contact pin 31, i.e., less than distance H, their respective shoulders 26b through 31b will compress their respective springs 26a through 31a.

Any contact pin which engages the bottom of its respective recess completes a electrical circuit from the controller through the contact pin, through the reader body 40 and the reading pin 35,38 and the key 22 to ground. By sensing the number of contact pins through which current passes, the controller determines the depth of the notch being read. After each key notch position has been read, the key is indexed horizontally for reading of the next notch position. This is continued until all notch positions along the key have been read.

In accordance with a preferred use of the present invention, this information would be utilized to instruct a key cylinder manufacturing apparatus to construct a key cylinder having tumblers shaped and positioned to mate with this particular lock.

However, this depth information can also be used in numerous other ways. For example, it can be utilized to operate an apparatus to manufacture a duplicate key. Also, it can be used to electronically unlock a secured area wherein, instead of cooperating with tumblers of a lock cylinder, the notches constitute a code which, having been read can generate an electrical signal which can then be utilized to open a lock. Such electronic systems ar especially useful for hotels and other public facilities where security is important and it is necessary to frequently and easily change a lock, e.g., by simply changing the electronic code of the lock. Such a system is shown, for example in U.S. Pat. Nos. 4,415,893 and 4,433,487.

Although the invention has been described in considerable detail, it will be apparent that the invention is capable of numerous modifications and variations, apparent to those skilled in the art, without departing from the spirit and scope of the invention.

I claim:

1. An apparatus for reading the depth of notches on a key, comprising:
   a reading pin mounted on a frame for movement along a path towards and away from a notch of a key, the depth of which is to be read,
   a plurality of contact pins mounted on the frame substantially parallel to the reading pin for movement parallel to said path, with and relative to the reading pin after the reading pin has reached a reference position relative to the notch being read, there being a separate contact pin for each different depth which is capable of being sensed at that notch, and
   a reader body fixed to the reading pin for movement therewith, said reader body having sensing means which cooperates with the contact pins for determining the depth of the notch being read as a function of the movement of the contact pins relative to the reading pin.

2. An apparatus according to claim 1, said sensing means comprising recesses in the reader body, one recess associated with each contact pin, each recess being of a different depth, taken in the direction parallel to said path the frame being moveable parallel to said path a predetermined distance after the reading pin has reached said reference position, wherein the depth at that notch is a function of the number of contact pins which engage the bottoms of their respective recesses.

3. An apparatus according to claim 2, including a controller means electrically connected to each contact pin, wherein as each contact pin engages the bottom of its respective recess, it permits an electrical signal to pas through that contact pin to the controller, wherein, by sensing the number of contact pins which have an electrical current passing therethrough, the controller senses the depth of that notch.

4. An apparatus according to claim 1, wherein the frame is moveable in the axial direction of the reading pin until and after the reading pin engages the key at a reference position, the reading pin being spring biased towards a stop position, toward the key, and initially moveable in the opposite direction, relative to the frame by an amount reflecting the depth of the notch being read, upon continued axial movement of the frame, the contact pins being spring biased towards the key and moveable away from the key against their respective springs, wherein when the frame continues its movement towards the key, after the reference position, for a predetermined axial distance, those contact pins which have engaged their respective recesses move against their springs until the frame has finished moving its predetermined distance.

5. An apparatus according to claim 1, said frame being mounted for linear movement towards and away from the key, said frame having upper and lower arms, the reading pin extending through the arms and the contact pins spaced circumferentially around the reading pin.

6. An apparatus according to claim 5, the reading pin and all contact pins being spring biased towards the key by spring means located between the two arms of the frame.

7. An apparatus according to claim 6, the reader body having a plurality of recesses, one aligned with each contact pin, each recess being of a different depth, the said sensing means defined by the contact pins and their respective recesses, the depth of the notch dependent on the number of contact pins which engage their respective recesses as the contact pins move after the reading pin has engaged the key at that respective notch position.

8. An apparatus according to claim 7, the frame being of an electrically insulating material, the contact pins, the reading pin and the reader body being electrically conductive, wherein as each contact pin engages its recess in the reader body it transmits an electrical signal therethrough, and the depth of the notch is a function of the number of contact pins which engage their respective recesses and transmit an electrical signal therethrough.

9. An apparatus for determining the construction of a lock by reading the notches of a key intended to be used with that lock, comprising:
a key reading apparatus for sensing the depth of a plurality of different notches of that key,
mounting means for mounting the key for movement in a direction parallel to that edge of the key having the notches therein for indexing different key notch positions along that edge,
said key reading apparatus further comprising a reading pin mounted on a frame for movement along a path towards and away from a notch of a key, the depth of which is to be read,
a plurality of contact pins mounted on the frame substantially parallel to the reading pin for movement parallel to said path, with and relative to the reading pin after the reading pin has reached a reference position relative to the notch being read, there being a separate contact pin for each different depth which is capable of being sensed at that notch, and
a reader body fixed to the reading pin for movement therewith, said reader body having sensing means which cooperates with the contact pins for determining the depth of the notch being read as a function of the axial movement of the contact pins relative to the reading pin.

10. An apparatus according to claim 9, said sensing means comprising recesses in the reader body, one recess associated with each contact pin, each recess being of a different depth, taken in the direction parallel to said path, the frame being moveable parallel to said path to a predetermined distance after the reading pin has reached said reference position, wherein the depth at that notch is a function of the number of contact pins which engage the bottoms of their respective recesses.

11. An apparatus according to claim 10, including a controller means electrically connected to each contact pin, wherein as each contact pin engages the bottom of its respective recess, it permits an electrical signal to pass through that contact pin to the controller, wherein, by sensing the number of contact pins which have an electrical current passing therethrough, the controller senses the depth of that notch.

12. An apparatus according to claim 9, wherein the frame is moveable in the axial direction of the reading pin until and after the reading pin engages the key at a reference position, the reading pin being spring biased towards a stop position, toward the key, and initially moveable in the opposite direction, relative to the frame by an amount reflecting the depth of the notch being read, upon continued axial movement of the frame, the contact pins being spring biased towards the key and moveable away from the key against their respective springs, wherein when the rame continues its movement towards the key, after the reference position, for a predetermined axial distance, those contact pins which have engaged their respective recesses move against their springs until the frame has finished moving its predetermined distance.

13. An apparatus according to claim 9, said frame being mounted for linear movement towards and away from the key said frame having upper and lower arms, the reading pin extending through the arms and the contact pins spaced circumferentially around the reading pin, and wherein the reading pin and all contact pins are spring biased towards the key by spring means located between the two arms of the frame.

14. An apparatus according to claim 13, the reader body having a plurality of recesses, one aligned with each contact pin, each recess being of a different depth, the said sensing means defined by the contact pins and their respective recesses, the depth of the notch dependent on the number of contact pins which engage their respective recesses as the contact pins move after the reading pin has engaged the key at that respective notch position.

15. An apparatus according to claim 14, the frame being of an electrically insulating material, the contact pins, the reading pin and the reader body being electrically conductive, wherein as each contact pin engages its recess in the reader body it transmits an electrical signal therethrough, and the depth of the notch is a function of the number of contact pins which engage their respective recesses and transmit an electrical signal therethrough.

16. A method of reading the depth of notches on a key, comprising the steps of:

positioning the key to be read, moving a reading pin into a notch of the key, the depth of which notch is to be read, moving a plurality of contact pins parallel to the reading pin, after the latter has reached the notch, there being a separate contact pin for each different depth which is capable of being sensed at that notch, and sensing movement of the respective contact pins and generating a signal representing the depth of that notch as a function of the movement of the contact pins.

17. The method of claim 16, wherein the contact pins are mounted on a frame which moves a predetermined distance for each notch depth reading, and the sensing step comprises engaging the contact pins with a reader body which is fixed for movement with the reading pin, such that at least one contact pin engages the reader body to close an electrical contact, the notch depth being dependent on the number of contact pins which engage the reader body to close an electrical contact.

18. The method of claim 17, wherein the sensing step further includes generating an electrical signal through each contact pin which engages its respective reader body, and sensing all generated electrical signals with a controller, and recording the depth of the notch in response thereto.

19. The method of claim 16, wherein the step of positioning the key includes first positioning the key to have one notch read and then indexing the key along its length for reading a plurality of notches of that key, repeating for each notch the steps of moving a reading pin, moving a plurality of contact pins and sensing movement of the contact pins.

* * * * *